Patented Aug. 20, 1940

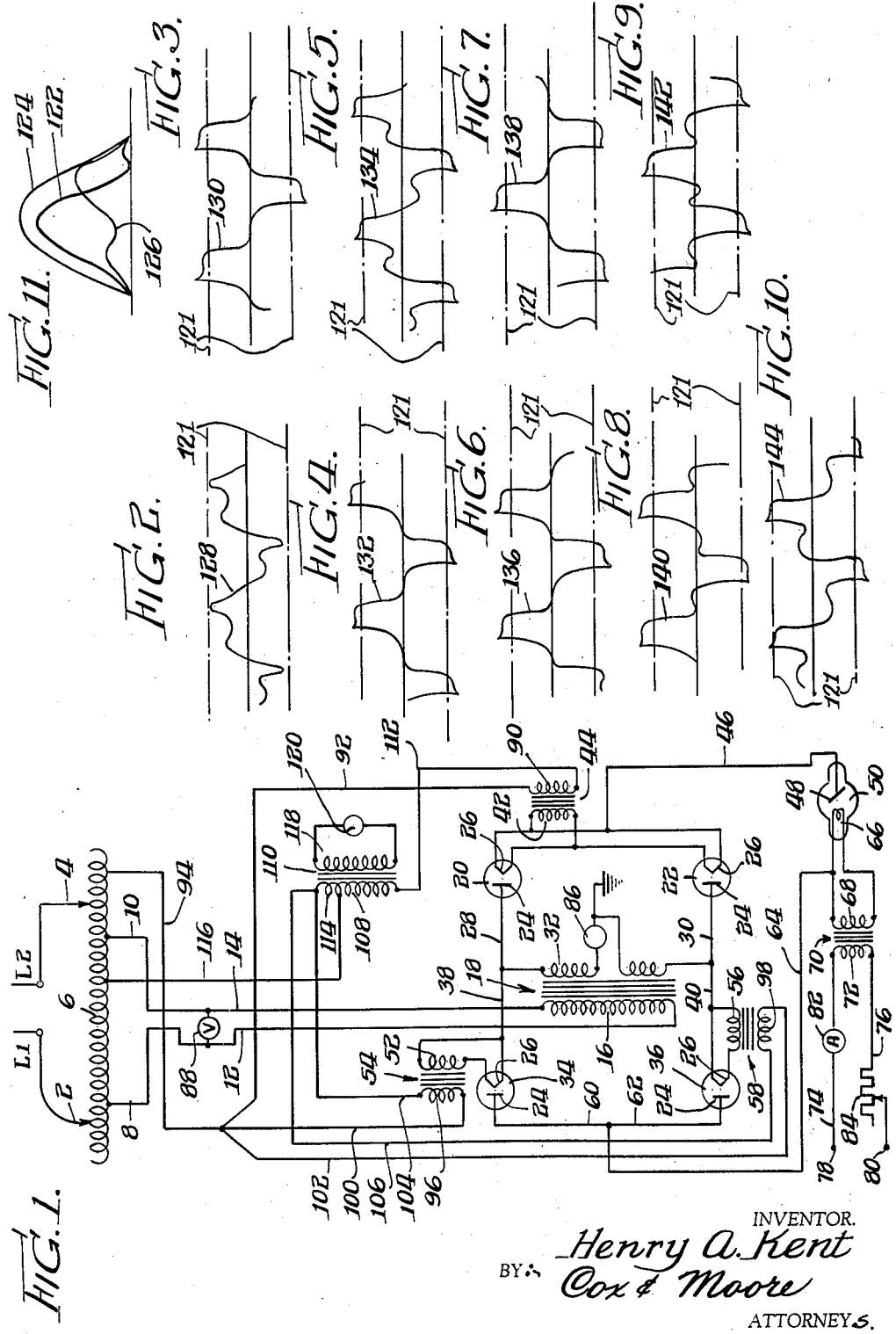

2,212,025

UNITED STATES PATENT OFFICE 2,212,025

X-RAY APPARATUS

Henry A. Kent, Oak Park, Ill., assignor to General Electric X-Ray Corporation, Chicago, Ill., a corporation of New York Application June 3, 1938, Serial No. 211,527

10 Claims. (Cl. 250—100)

This invention relates to a rectifier circuit for energizing an X-ray tube, and particularly to means in said circuit for indicating the operative or inoperative condition of the rectifier.

In present-day X-ray apparatus employing rectifier tubes the rectifier tubes are mounted within a housing located at a point remote from the control stand and in some cases in a room separate from the room in which the control stand is located. It is therefore impossible for the operator to determine from his position at the control stand whether the rectifiers are in proper operating condition or whether they have become burned out or otherwise rendered inoperative, and this inability presents the danger that the operator may operate the energizing control for the X-ray tube when one or more of the rectifier tubes is inoperative. If this be done the X-ray tube is subjected to a dangerously high voltage or is only partially energized or not energized at all, and without the operator being aware of this fact. It may occur therefore that considerable time is wasted at a critical period before the operator discovers that the rectifier tube and the X-ray tube are not in proper condition or are inoperative. Accordingly, an object of applicant's invention is to provide simple, compact and efficient means providing a signal indication, at the control stand or adjacent thereto, of the operating condition of the rectifier.

It is a further object of applicant's invention to provide a positive low voltage indicator, which may be located remotely from the rectifier tubes, and which is automatically operable to indicate when one or more of the tubes of the rectifier becomes inoperable.

Applicant's invention further contemplates the provision of means for visibly indicating to the operator at the control stand the operating condition of the filament circuits of the Kenotron rectifier tubes so that the operator will not energize the high voltage equipment when one of the filament circuits is inoperative.

Another object of applicant's invention is to provide instantaneously operable means for indicating at a remote point the operating condition of the Kenotron tubes of the rectifier.

A further important object of applicant's invention is to provide automatically operable, visual indicating means not only responsive to the failure or de-energization of any single one of the rectifier tubes of an X-ray installation, but also responsive to the failure or de-energization of any combination of two or more of said tubes and thereby insuring that under all circumstances the visual indicating means will properly indicate the condition of the entire rectifier, comprising a plurality of such rectifier tubes.

Other and further objects and advantages of the invention will be apparent from the following description when taken in connection with the accompanying drawing, wherein:

Fig. 1 is a schematic diagram of an X-ray tube circuit embodying the invention.

Figs. 2 to 10 are oscillograph records illustrating the operation of the circuit of Fig. 1.

Fig. 11 is a voltage diagram in theoretical explanation of the invention.

The alternating current supply leads L1 and L2 are connected to the adjustable taps 2 and 4 of an autotransformer 6, the adjustable taps 8 and 10 of which are in turn connected by leads 12 and 14 to the primary winding 16 of a high tension transformer 18. A pair of Kenotron rectifier tubes 20 and 22, each having a plate 24 and a cathode or filament 26, have their plates 24 connected by wires 28 and 30 to the opposite ends of the secondary winding 32 of the transformer 18.

A pair of similar Kenotron rectifier tubes 34 and 36, each also having a plate 24 and a cathode or filament 26, have their filaments 26 connected by wires 38 and 40 to the opposite ends of said secondary winding 32.

The filaments 26 of the rectifier tubes 20 and 22 are connected in parallel across the secondary winding 42 of a filament current transformer 44 and in common by a wire 46 to the anode 48 of the X-ray tube 50. The filament 26 of the rectifier tube 34 is supplied with heating current by the secondary winding 52 of a filament transformer 54 and the filament 26 of the rectifier tube 36 is similarly provided with heating current by the secondary winding 56 of the filament transformer 58.

The plates 24 of the rectifier tubes 34 and 36 are connected by wires 60 and 62 to a common wire or lead 64 connected to the cathode or filament 66 of the X-ray tube 50. Heating current is supplied to the filament 66 of the X-ray tube by the secondary winding 68 of a filament transformer 70, the primary winding 72 of which is connected by leads 74 and 76 to the supply terminals 78 and 80, which supply terminals may be connected to the autotransformer 6 or directly to the supply leads L1 and L2, as desired.

In the leads 74 and 76 are interposed an ammeter 82 and a variable resistance regulator 84, preferably located at the usual control stand (not shown), which commonly is positioned in relative proximity to the X-ray tube and X-ray table or exposure stand. A milliammeter 86, for measuring the space current supplied to the X-ray tube, is preferably connected in series with the two halves of the secondary winding 32 of the transformer 18 and is located at the control stand. Rectifier tubes 20, 22, 34 and 36, together with the transformers 18, 44, 54 and 58, are located at a point relatively remote from the X-ray tube, the X-ray table or exposure stand, and the control stand. The control autotransformer 6 is preferably located at the control stand for regulating the voltages supplied to the remotely located high tension transformer 18.

The rectifier tubes 20, 22, 34 and 36 are connected, as described, in the form of a bridge circuit forming a full-wave rectifier and this full-wave rectifier at the relatively remote point is connected by the high voltage leads 46 and 64 to the tube 50. Any of the suitable means well known in the art may be employed for rendering these leads shock proof. A voltmeter 88, located at the control stand, is connected across the wires 12 and 14 for indicating the value of the voltage impressed across the primary of the high tension transformer 18.

One end of the primary winding 90 of the filament transformer 44 is connected by a wire 92 and a wire 94 to the autotransformer 6. Similarly one end of the primary winding 96 of the filament transformer 54 and one end of the primary winding 98 of the filament transformer 58 are connected by wires 100 and 102, respectively, to the wire 94 and thereby to the autotransformer 6. The other ends of the primary windings 96 and 98 are connected by wires 104 and 106, respectively, to one end of the primary winding 108 of a series transformer 110. The opposite end of the primary winding 108 is connected by the wire 112 to the remaining end of the primary winding 90 of the filament transformer 44.

The primary 108 is provided with an adjustable tap 114 connected by a wire 116 to the autotransformer 6 whereby an intermediate point of the transformer winding 108 is connected to the source of supply and the current for the filament transformers 54 and 58 flows through the primary winding 108 in a direction opposite to the direction in which the current for the filament transformer 44 flows through said primary winding 108.

The secondary 118 of the transformer 110 is connected directly across a neon lamp 120 or other critical voltage tube or visual indicator.

The series transformer 110 preferably comprises a substantially rectangular, closed magnetic steel core, on one leg of which the primary winding 108 is mounted and on the other leg of which the secondary winding 118 is mounted. The secondary winding preferably consists of many turns of fine wire and the transformer is so designed as to have a definite, relatively low voltage magnetic saturation point. The transformer 110 constitutes a normally open circuited, high leakage reactance, differentially energized series transformer.

In presetting or adjusting the transformer for proper operation, the tap 114 is adjusted along the primary winding 108 above the electrical center or midpoint of the primary winding 108, as seen in Fig. 1, until, with all of the Kenotron rectifiers 20, 22, 34 and 36 operating properly, the voltage impressed by the secondary winding 118 on the neon lamp 120 is below the igniting or firing voltage of said lamp.

The load current, supplied through the upper section of the primary winding 108 to the filament transformers 54 and 58, is slightly greater than the load current supplied through the lower section of the primary winding 108 to the filament transformer 44. The exciting current for the filament transformers 54 and 58, which exciting current also passes through the upper portion of the winding 108, is substantially twice the value of the exciting current for the filament transformer 44, which exciting current passes through the lower portion of the winding 108.

It will be apparent that the load current and exciting current supplied to the filament transformer 44 are, by means of the primary winding 108 of the transformer 110, magnetically opposed to the combined load and exciting currents supplied to the filament transformers 54 and 58. Since the combined load current taken by the filament transformers 54 and 58 is slightly greater than the load current taken by the filament transformer 44, the tap 114 will be moved above the electrical midpoint to magnetically balance these load currents of different values. The combined exciting currents of the transformers 54 and 58 exceed in value the exciting current taken by the transformer 44 and the adjustable tap 114 is therefore moved an additional distance above the electrical midpoint of the winding 108 so as to magnetically balance a portion of the load current taken by the transformer 44 against the excess exciting current taken by the transformers 54 and 58.

Stating it in another way, the load current components of the three filament transformers 44, 54 and 58 are substantially balanced out magnetically. The exciting current component of the filament transformer 58, for example, is balanced out magnetically by the exciting current component of the filament transformer 44 and the exciting current component taken by the filament transformer 54, for example, is partially balanced out magnetically by a portion of the load current of the transformer 44.

The wave form of the exciting current of each filament transformer 44, 54, and 58 is distorted in shape and possesses the usual relatively strong third harmonic. The approximate wave form of the transformer secondary voltage produced by the exciting current component of the transformer 54, for example, is shown in Fig. 11 as the voltage wave 122. The voltage, produced in the secondary 118 of the transformer 110 by the sinusoidal load current of the filament transformer 44, is shown in Fig. 11 as the sine wave 124. The wave form of the resultant voltage normally impressed upon the neon lamp 120 when all of the Kenotron rectifier tubes 20, 22, 34 and 36 are in operative condition, is shown in Fig. 11 as the distorted voltage wave 126. The sine wave voltage produced in the secondary winding 118 by the combined load current of the filament transformers 54 and 58 is not shown in Fig. 11, since this sine wave voltage is balanced out by a like sine wave voltage produced in the secondary 118 and by the major portion of the load current of the filament transformer 44.

It will be seen that by means of the transformer 110, the load and exciting current components of the three filament transformers 50, 54, and 58 are partially balanced out magnetically to produce in the secondary of the transformer a double-peaked voltage wave 126, with the peaks below the firing or igniting voltage of the neon lamp across which this voltage is normally impressed.

The curve 128 of Fig. 2 represents the voltage wave normally impressed across the terminals of the neon lamp 120 when the filament circuits to these tubes are all completed and said tubes are in operative condition. The actually recorded voltage wave 128 is substantially the same as the resultant voltage wave indicated at 126 in Fig. 11.

Fig. 3 illustrates the wave form of the voltage impressed across the neon lamp when the filament circuit to the Kenotron tube 20 has been broken and said tube rendered inoperative. With this tube 20 in this inoperative condition the load current taken by the filament transformers 54 and 58 is greatly in excess of the current taken by the filament transformer 44 and consequently the resultant voltage impressed across the neon lamp 120 exceeds the ignition voltage of said lamp. The lamp accordingly breaks down and gives a visual indication that one of the tubes has become inoperative. The current supplied to, and the voltage applied across, the lamp after the lamp has broken down or ignited is limited by the saturation of the core and the impedance of the secondary circuit of the transformer 110. The wave 130 of Fig. 3 represents the voltage impressed on the neon tube when the rectifier tube 20 is in this inoperative condition and the effect of the saturation of the transformer and of the high impedance of the secondary winding is evident in the substantially square-topped form of this wave 130.

The wave 132 of Fig. 4 represents the voltage impressed across the neon tube when the filament circuit of the rectifier tube 34 is broken and said tube is in inoperative condition. When the tube 34 is in this inoperative condition the load current component of the transformer 44 greatly exceeds the combined load and exciting components of the two filament transformers 54 and 58 and the voltage accordingly impressed on the neon tube is in excess of its critical operating or firing voltage.

The wave 134 represents the voltage impressed across the neon tube 120 when the filament circuits to both of the tubes 20 and 34 are incompleted and said tubes in inoperative condition. With these tubes in inoperative condition the load currents components of the transformers 44 and 58 are balanced out magnetically but the combined exciting current components of the transformers 54 and 58 are only partially balanced out by the load and exciting current components of the transformer 44. The load current component of the transformer 44, which is now available for balancing against the extra exciting current component of one of the transformers 54 and 58, is substantially half of that normally available for this purpose. Hence under these circumstances the resultant voltage produced by a sine wave 124 of smaller magnitude balanced against a voltage wave 122 produced by the unbalanced exciting current components exceeds the critical value or igniting voltage of the neon lamp 120.

It will be seen from Fig. 5 that the first peak of the resultant voltage was insufficient to operate the neon tube but that the second peak was of sufficiently increased magnitude to ignite the tube and that the resultant voltage increase caused by the reduced resistance of the neon lamp was limited by the saturation of the transformer and the high resistance of the secondary winding.

Fig. 6 shows the voltage wave 136 impressed across the neon tube when the filament circuits to the tubes 20 and 22 are broken.

Fig. 7 shows a similar voltage wave 138 when the filament circuits in the tubes 34 and 36 are broken.

Fig. 8 shows the neon tube voltage 140 when the filament circuits to the tubes 20, 34 and 36 are broken.

Fig. 9 shows similar voltage 142 impressed on the neon tube when the filament circuits to the tubes 20, 22 and 34 are inoperative.

Fig. 10 shows the voltage wave 144 impressed across the neon tube when the filament circuits to all of the rectified tubes 20, 22, 34 and 36 are broken.

It will be seen from Figs. 2 to 10 that the neon tube 120 is inoperative when all of the Kenotron rectifier tubes are operating properly and is rendered operative when any one or any combination of two or more of the Kenotron rectifier filament circuits becomes inoperative, the square peak or top of each of the voltage waves in Figs. 3 to 10 showing that a relatively large current is flowing through the tube and that the voltage impressed across the tube has accordingly been limited by the magnetic saturation of the transformer and the high resistance of the secondary winding thereof.

It will be seen from the foregoing description that applicant has provided a simple and efficient means for visibly indicating to the operator at the control stand the operating condition of the filament circuits of the remotely located Kenotron rectifier tubes so that the operator, having the benefit of this indication, will not energize the high voltage equipment when the filament circuit to one or more of these tubes is inoperative.

It will be further evident that applicant has provided simple and efficient indicating means automatically operable to indicate the operating condition of the filament circuits of the rectifier tubes of an X-ray apparatus and that such means is rendered operative in response to the de-energization or failure of any one or any combination of two or more of the filament circuits of the rectifier tubes.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. X-ray apparatus comprising an X-ray tube, a plurality of rectifiers connected to said tube for delivering rectified electrical energy thereto, means for energizing said rectifiers from an alternating current source, an electrically actuated indicator operable when energized above a critical voltage, and transfer means operatively associated with said indicator and with all of said rectifiers for delivering energy to said indicator, said transfer means being differentially associated with said rectifiers whereby normally to deliver to said indicator energy corresponding to a differential resultant of currents in said rectifiers, said energy applied to the indicator being normally insufficient to operate the same, but said differential association of the transfer means with said rectifiers being such that energy delivered to said indicator will operate the same upon abnormal reduction of current flow in any of said rectifiers.

2. X-ray apparatus comprising an X-ray tube, a rectifying circuit comprising a plurality of thermionic rectifiers connected with the X-ray tube to deliver rectified electrical power thereto from a source of alternating current power, indicating means comprising an electron discharge device operable when energized above a critical voltage, and transfer means operatively associated with all of said thermionic tubes and differentially with respect to current flow therein, said transfer means being operatively associated with said electron discharge device to energize the same in accordance with the differential of current flow in all of the thermionic rectifiers, said differential normally having a voltage value less than the critical operating voltage of said discharge device, whereby said discharge device may be operated only when the voltage of said differential rises above said critical value through the abnormal reduction of current flow in any of said rectifiers.

3. X-ray apparatus comprising an X-ray tube, a source of alternating current, a plurality of rectifier tubes each having an anode and a cathode, means for connecting said source to the anode of one of said tubes and to the cathode of another of said tubes to rectify said alternating current, means for connecting the cathode of said one tube and the anode of said other tube to said X-ray tube to supply rectified current thereto, a plurality of heating circuits, one for the cathode of each of said rectifier tubes, a luminous discharge tube operable at a critical voltage, a transformer having its secondary connected to said luminous discharge tube, the primary of said transformer having a first portion connected in one of said heating circuits and a second portion connected oppositely in the other of said heating circuits for differentially opposing the currents flowing in said heating circuits whereby upon decrease in the heating current to one of said rectifier tubes said transformer secondary impresses on said luminous discharge tube a voltage sufficient to operate said luminous discharge tube.

4. X-ray apparatus comprising an X-ray tube, a source of alternating current, a plurality of rectifier tubes each having an anode and a cathode, means for connecting said source to the anode of one of said rectifier tubes and to the cathode of another of said rectifier tubes to rectify said alternating current, means for connecting the cathode of the said one tube and the anode of said other tube to said X-ray tube to supply rectified current thereto, a pair of heating circuits, one for the cathode of each of said rectifier tubes, a luminous discharge tube operable at a critical voltage and means for opposing the currents flowing in said heating circuits and impressing a voltage corresponding with the difference of said currents on said luminous discharge tube.

5. X-ray apparatus comprising an X-ray tube, a high tension source of alternating current, a full wave rectifier including a pair of thermionic rectifying tubes having their anodes connected to said high tension source and a second pair of thermionic rectifying tubes having their cathodes connected to said high tension source, a low voltage source of alternating current, individual transformers connected to said low voltage source supplying heating current for each tube of one of said pairs of rectifying tubes and a single transformer supplying heating current for both tubes of said other pair of rectifying tubes, a luminous discharge tube operable at a critical voltage, a saturable transformer having a secondary connected to said luminous discharge tube and having magnetically opposed primary windings to one of which said individual transformers are connected in parallel and to the other of which said single transformer is connected whereby, upon functional failure of any one of said rectifying tubes and any combination of two or more of said rectifying tubes, the secondary of said saturable transformer impresses on said luminous discharge tube a voltage in excess of the igniting voltage of said luminous discharge tube.

6. An X-ray tube, a high tension source of alternating current, a full wave rectifier comprising a plurality of thermionic rectifying tubes connected in a bridge circuit to said high tension source and to said X-ray tube, a luminous discharge tube operable at a critical voltage, a low voltage source of alternating current, a plurality of filament transformers connected to said low voltage source for supplying heating current to said rectifying tubes, means for magnetically balancing the exciting and load current components of the current supplied to one of said transformers against the load and exciting current components of the current supplied to another of said transformers and for magnetically opposing the exciting and load current components of a third of said transformers against the load current component of the current supplied to said other transformers for impressing on said luminous discharge tube a voltage normally insufficient to operate the same, said means being operable in response to the functional failure of any one of said rectifying tubes and any combination of two or more of said rectifying tubes to impress on said luminous discharge tube a voltage exceeding the igniting voltage of said luminous discharge tube.

7. X-ray apparatus comprising an X-ray tube, circuit means for energizing said tube, said circuit means including circuit portions normally in substantial electrical balance, an indicator, and transfer means operatively associated with said indicator and with said circuit portions to control the delivery of energy for operating said indicator in response to the functional failure of one of said circuit portions, whereby unbalanced electrical conditions are set up.

8. X-ray apparatus comprising an X-ray tube, a source of alternating current, a plurality of rectifier tubes connected to said source and to the X-ray tube for energizing said X-ray tube, said rectifier tubes having cathodes, a heating circuit for each of said cathodes, an indicator, and transfer means operatively associated with said indicator and with said heating circuits for impressing a voltage, proportional to the difference of the currents flowing in said heating circuits, on said indicator for operating said indicator in response to the functional failure of a rectifier tube.

9. X-ray apparatus comprising an X-ray tube, a source of alternating current, a plurality of rectifier tubes in a bridge circuit connected to said source and to the X-ray tube for energizing said X-ray tube, said rectifier tubes being located remotely from said X-ray tube, control means located in relative proximity to said X-ray tube, an indicator adjacent said control means, each of said rectifier tubes having a cathode, a heating circuit for each of said cathodes, and transfer means operatively associated with said indicator and with said heating circuits for impressing a voltage, proportional to the difference of the currents flowing in said heating circuits, on said indicator for operating said indicator in response to the functional failure of a rectifier tube.

10. X-ray apparatus comprising an X-ray tube, a source of alternating current, a full wave rectifier including a pair of thermionic rectifying tubes having their anodes connected to said source and their cathodes connected to said X-ray tube and a second pair of thermionic rectifying tubes having their cathodes connected to said source and their anodes connected to said X-ray tube, individual means connected to said source for supplying heating current to each tube of one of said pairs of rectifying tubes and a common means of supplying heating current to both tubes of said other pair of rectifying tubes, an indicator, transfer means for delivering energy for actuating said indicator, said transfer means being operatively associated with said individual means and said common means, thereby controlling the energy delivered by said transfer means to said indicator, differentially in accordance with the currents flowing to said individual means and the current flowing to said common means, whereby to produce in said transfer means a voltage proportional to the difference of said currents and for impressing said voltage on said indicator, thereby to energize said indicator upon the functional failure of any one of said rectifier tubes and any combination of two or more of said rectifier tubes.

HENRY A. KENT.